(12) United States Patent
Nagata et al.

(10) Patent No.: US 9,244,557 B2
(45) Date of Patent: Jan. 26, 2016

(54) INPUT DEVICE AND A DISPLAY DEVICE INCLUDING THE INPUT DEVICE

(75) Inventors: Yasunari Nagata, Kirishima (JP);
Takashi Minami, Kirishima (JP);
Takashi Shimizu, Kirishima (JP);
Natsuko Yamagata, Kirishima (JP);
Akinori Sato, Kirishima (JP); Yoshio Miyazaki, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 267 days.

(21) Appl. No.: 13/395,401

(22) PCT Filed: Sep. 30, 2010

(86) PCT No.: PCT/JP2010/067041
§ 371 (c)(1),
(2), (4) Date: Mar. 9, 2012

(87) PCT Pub. No.: WO2011/052335
PCT Pub. Date: May 5, 2011

(65) Prior Publication Data
US 2012/0169644 A1    Jul. 5, 2012

(30) Foreign Application Priority Data
Oct. 30, 2009 (JP) ................................. 2009-251530

(51) Int. Cl.
*G06F 3/044* (2006.01)
*G06F 3/041* (2006.01)
*G02F 1/1333* (2006.01)

(52) U.S. Cl.
CPC .......... *G06F 3/0412* (2013.01); *G02F 1/13338* (2013.01); *G06F 3/044* (2013.01); *G06F 2203/04111* (2013.01)

(58) Field of Classification Search
CPC ............................... G06F 3/044; G06F 3/0412
USPC .................................................. 345/173–178
See application file for complete search history.

(56) References Cited

U.S. PATENT DOCUMENTS

| 2005/0116340 A1* | 6/2005 | Shindo | H01L 24/03 257/737 |
| 2005/0146516 A1* | 7/2005 | Nishiyama | G06F 3/045 345/176 |

(Continued)

FOREIGN PATENT DOCUMENTS

| CN | 101082713 A | 12/2007 |
| JP | 05-114329 | 5/1993 |

(Continued)

OTHER PUBLICATIONS

Japanese language international preliminary report on patentability dated Jun. 21, 2012 and its English language translation issued in corresponding PCT application PCT/JP2010/067041.

(Continued)

*Primary Examiner* — Temesgh Ghebretinsae
*Assistant Examiner* — Lisa Landis
(74) *Attorney, Agent, or Firm* — Volpe and Koenig, P.C.

(57) ABSTRACT

An input device includes a substrate having a first main surface and a second main surface located opposite to the first main surface; a protective member having an opposed surface opposite to the first main surface; a bonding member configured to bond the first main surface and the opposed surface to each other; a first coloring member disposed between the first main surface and the opposed surface, the first coloring member being in contact with the bonding member; and a second coloring member disposed on the second main surface and having a color different from a color of the first coloring member.

4 Claims, 7 Drawing Sheets

(56) References Cited

U.S. PATENT DOCUMENTS

| | | | |
|---|---|---|---|
| 2009/0303195 A1* | 12/2009 | Yamato et al. | 345/173 |
| 2010/0026663 A1* | 2/2010 | Iwasaki | G06F 3/045 345/174 |
| 2011/0267286 A1* | 11/2011 | Hsu | G06F 3/041 345/173 |

FOREIGN PATENT DOCUMENTS

| | | |
|---|---|---|
| JP | 08-234906 | 9/1996 |
| KR | 100241486 B1 | 2/2000 |

OTHER PUBLICATIONS

Korean language office action dated Jun. 17, 2013 and its English language Statement of Relevance of Non-English References Pursuant to 37 CFR 1.98(a)(3)(i) cites the foreign patent document listed above.

Chinese language office action dated Jan. 6, 2014 and its English language concise explanation issued in corresponding Chinese application 201080037434.9 cites the foreign patent document listed above.

* cited by examiner

INPUT DEVICE AND A DISPLAY DEVICE INCLUDING THE INPUT DEVICE

CROSS-REFERENCE TO THE RELATED APPLICATIONS

This application is a national stage of international application No. PCT/JP2010/067041, filed on Sep. 30, 2010, and claims the benefit of priority under 35 USC 119 to Japanese Patent Application No. 2009-251530, filed on Oct. 30, 2009, the entire contents of which are incorporated herein by reference.

TECHNICAL FIELD

The present invention relates to an input device and a display device equipped with the input device.

BACKGROUND ART

Recently, input devices having a display pattern disposed in an outer area located outside an input area for the purpose of improvement in design of the input devices have been known (for example, see Patent Literature 1). Such an input device includes a substrate and a protective member bonded to the substrate with a bonding member interposed therebetween. The input device includes coloring members for plural colors covered with the bonding member between the substrate and the protective member, whereby a display pattern is formed in the outer area.

CITATION LIST

Patent Literature

Patent Literature 1: Japanese Unexamined Patent Publication JP-A 5-114329 (1993)

SUMMARY OF INVENTION

Technical Problem

However, when a plurality of coloring members are disposed between the substrate and the protective member, a level difference occurs between the coloring members. Since a level difference occurs between the coloring members, the flatness of a bonding surface of the bonding member to be bonded to the substrate is damaged. Accordingly, there is a problem in that air is introduced into gaps of the bonding surface to lower bonding strength between the substrate and the protective member.

Here, when the thickness of the bonding member between the substrate and the protective member is made to increase to absorb the level difference between the coloring members in order to solve this problem, there is a problem in that the thickness of the input device increases and the size of the input device increases.

The invention is made in consideration of the above-mentioned problem and an object thereof is to improve the bonding strength between the substrate and the protective member and to suppress an increase in size.

Solution to Problem

According to an aspect of the invention, an input device includes: a substrate having a first main surface and a second main surface located opposite to the first main surface; a protective member having an opposed surface opposite to the first main surface; a bonding member configured to bond the first main surface and the opposed surface to each other; a first coloring member disposed between the first main surface and the opposed surface, the first coloring member being in contact with the bonding member; and a second coloring member disposed on the second main surface and having a color different from a color of the first coloring member.

Advantageous Effects of Invention

In the input device according to the invention, the bonding surface of the bonding member can be made to be flat. Accordingly, it is possible to improve the bonding strength between the substrate and the protective member and to suppress an increase in size of the input device.

BRIEF DESCRIPTION OF DRAWINGS

Other and further objects, features, and advantages of the invention will be more explicit from the following detailed description taken with reference to the drawings, wherein.

DESCRIPTION OF EMBODIMENT

Hereinafter, exemplary embodiments of the invention will be described in detail with reference to the accompanying drawings.

First Embodiment

Figure 1:
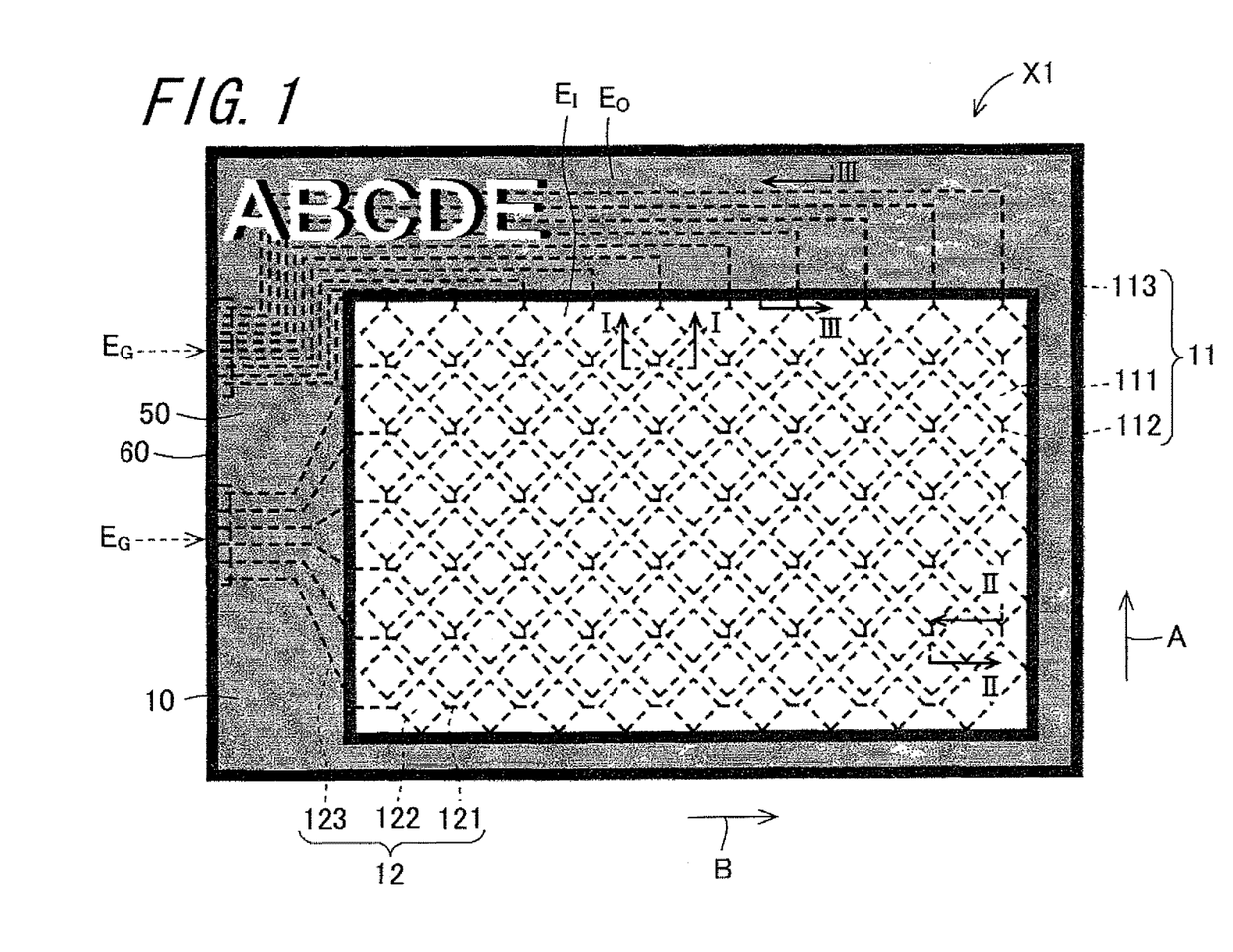
FIG. 1 is a plan view illustrating an input device X1 according to a first embodiment of the invention.

First, an input device X1 according to a first embodiment of the invention will be described. FIG. 1 is a plan view illustrating the input device X1 according to the first embodiment of the invention. Here, the input device X1 according to this embodiment is a capacitive touch panel.

As shown in FIG. 1, the input device X1 includes an input area $E_I$ which can be operated for input by a user and an outer area $E_O$ located outside the input area $E_I$. The outer area $E_O$ includes an external conductive area $E_G$ which is an area electrically connected to an FPC (Flexible Printed Circuit) (not shown) or the like.

Figure 2A:
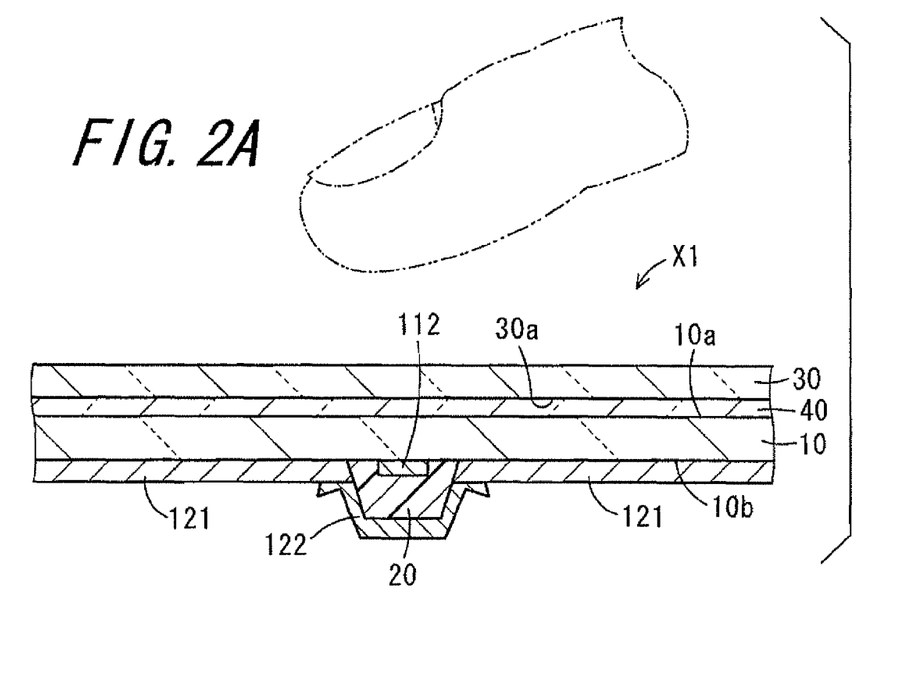
FIG. 2A is a cross-sectional view of the input device X1 taken along the line I-I of FIG. 1.
Figure 2B:
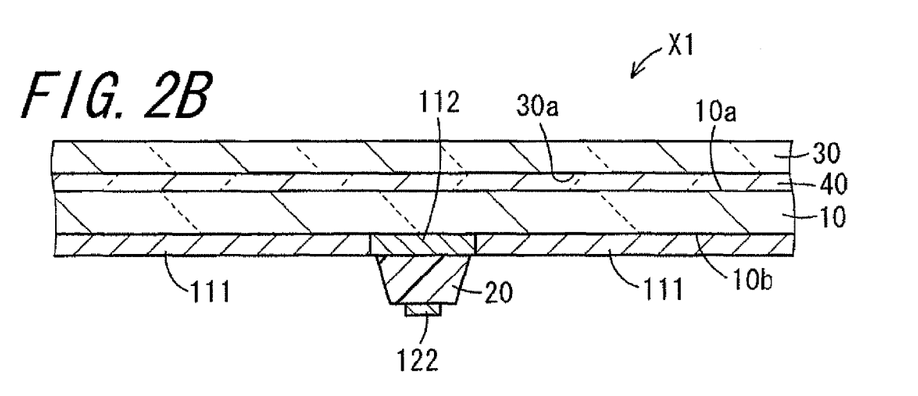
FIG. 2B is a cross-sectional view of the input device X1 taken along the line II-II of FIG. 1.
Figure 3:
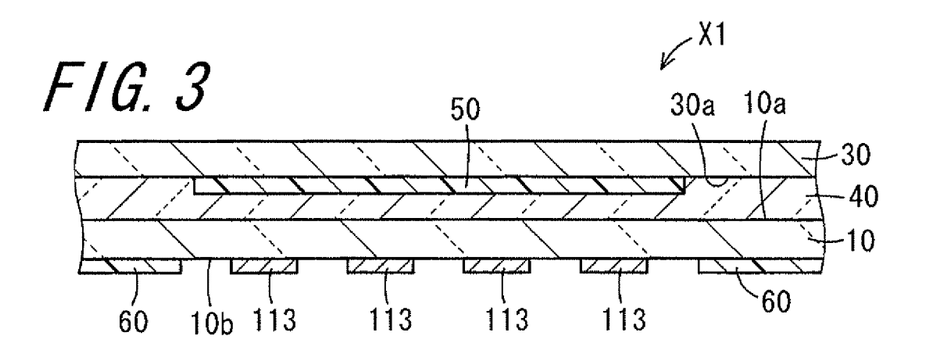
FIG. 3 is a cross-sectional view of the input device X1 taken along the line of FIG. 1.

As shown in FIGS. 1 to 3, the input device X1 includes a substrate 10, a first detection electrode pattern 11, a second detection electrode pattern 12, an insulating film 20, a first protective member 30, a first bonding member 40, a first coloring member 50, and a second coloring member 60.

FIG. 2A is a cross-sectional view of the input device X1 taken along the line I-I of FIG. 1. FIG. 2B is a cross-sectional view of the input device X1 taken along the line II-II of FIG. 1. FIG. 3 is a cross-sectional view of the input device X1 taken along the line of FIG. 1.

The substrate 10 includes a first main surface 10a and a second main surface 10b located opposite to the first main surface 10a, as shown in FIGS. 2A and 2B. The shape of the substrate 10 in a plan view is rectangular in this embodiment, but is not limited to this shape. Here, examples of the material of the substrate 10 include materials having transparency such as glass or plastics. The "transparency" means transparency with respect to visible light.

The first detection electrode pattern 11 is disposed on the second main surface 10b of the substrate 10 in the input area $E_I$. The first detection electrode pattern 11 includes first detection electrodes 111, first connection electrodes 112, and first detection lines 113.

The first detection electrodes 111 have a function of detecting the position of a finger or the like in the direction of arrow B parallel to the main surface of the input device X1. The first detection electrodes 111 are arranged in a matrix at predetermined intervals. The shape of the first detection electrodes 111 in a plan view is similar to a diamond shape in this embodiment, but is not limited to the shape. The material of the first detection electrodes 111 has to have transparency and electrical conductivity, and examples thereof include ITO (Indium Tin Oxide), IZO (Indium Zinc Oxide), ATO (Antimony Tin Oxide), AZO (Al-Doped Zinc Oxide), tin oxide, zinc oxide, and conductive polymers (such as PEDOT and PSS). For example, the first detection electrodes 111 are formed as follows. First, the material such as ITO is applied to the second main surface 10b of the substrate 10 to form a film through the use of a sputtering method, a vapor deposition method, or a chemical vapor deposition (CVD) method. A photosensitive resin is formed in a desired pattern, by applying the photosensitive resin to the surface of the film and exposing and developing the photosensitive resin. Subsequently, the film formed of the material such as ITO is etched with a chemical or the like to pattern the film, whereby the first detection electrodes 111 are formed.

The first connection electrodes 112 have a function of electrically connecting the neighboring first detection electrodes 111 to each other. The first connection electrodes 112 are disposed on the second main surface 10b of the substrate 10 in the input area $E_I$. The same materials as the first detection electrodes 111 can be used as the materials of the first connection electrodes 112. The method of forming the first connection electrodes 112 is the same as forming the first detection electrodes 111.

The first detection lines 113 have a function of applying a voltage to the first detection electrodes 111. The first detection lines 113 are disposed on the second main surface 10b of the substrate 10 in the outer area $E_O$. An end of each first detection line 113 is electrically connected to the first detection electrode 111 located at an end of the input area $E_I$ out of the first detection electrodes 111. The other end of each first detection line 113 is located in the external conductive area $E_G$. Examples of the material of the first detection line 113 include conductive materials such as ITO, tin oxide, aluminum, aluminum alloy, silver foil, and silver alloy. The method of forming the first detection line 113 is the same as forming the first detection electrode 111.

The second detection electrode pattern 12 is disposed on the second main surface 10b of the substrate 10 in the input area $E_I$. The second detection electrode pattern 12 includes second detection electrodes 121, second connection electrodes 122, and second detection lines 123.

The second detection electrodes 121 have a function of detecting the position of a finger or the like in the direction of arrow A parallel to the main surface of the input device X1. The second detection electrodes 121 are arranged in a matrix at predetermined intervals. The shape of the second detection electrodes 121 in a plan view is similar to a diamond shape in this embodiment, but is not limited to the shape. The same materials as in the first detection electrodes 111 can be used as the material of the second detection electrodes 121. The method of forming the second detection electrodes 121 is the same as forming the first detection electrodes 111.

The second connection electrodes 122 have a function of electrically connecting the neighboring second detection electrodes 121 to each other. The second connection electrodes 122 are disposed on the surface of the insulating film 20. That is, the second connection electrodes 122 intersect the first connection electrodes 112 with the insulating film 20 interposed therebetween. The same materials as in the first detection electrodes 111 can be used as the material of the second connection electrodes 122. The method of forming the second connection electrodes 122 is the same as forming the first detection electrodes 111.

The insulating film 20 has a function of insulating the first connection electrodes 112 and the second connection electrodes 122 from each other. The insulating film 20 is disposed on the second main surface 10b of the substrate 10 so as to cover the first connection electrodes 112. Examples of the material of the insulating film 20 include resins such as an acryl resin and an epoxy resin. The insulating film 20 is formed by applying the material to the second main surface 10b of the substrate 10 and exposing and developing the material.

The second detection lines 123 have a function of applying a voltage to the second detection electrodes 121. The second detection lines 123 are disposed on the second main surface 10b of the substrate 10 in the outer area $E_O$. An end of each second detection line 123 is electrically connected to the second detection electrode 121 located at an end of the input area $E_I$ out of the second detection electrodes 121. The other end of each second detection line 123 is located in the external conductive area $E_G$. The same materials as in the first detection lines 113 can be used as the material of the second detection line 123. The method of forming the second detection line 123 is the same as forming the first detection electrode 111.

The first protective member 30 has a function of preventing an external conductor such as a finger from coming in direct contact with the first main surface 10a of the substrate 10. The first protective member 30 has an opposed surface 30a opposing the first main surface 10a of the substrate 10. A user can input information to the input device X1 by bringing a finger into contact with or close to the surface of the first protective member 30 opposite to the opposed surface 30a. Here, examples of the material of the first protective member 30 include PET (Polyethylene Terephthalate), acryl, PC (Polycarbonate), and glass. Examples of the first protective member 30 include a polarizing plate or a decorative plate.

The first bonding member 40 has a function of bonding the opposed surface 10a of the first protective member 30 to the first main surface 10a of the substrate 10. Examples of the material of the first bonding member 40 include resins having transparency such as an acryl resin, an epoxy resin, and a silicone resin.

The first coloring member 50 has a function of decorating the outer area $E_O$ of the input device X1. The first coloring member 50 is disposed on the opposed surface 30a of the first protective member 30 in the outer area $E_O$. The first coloring member 50 is in contact with the first bonding member 40. Examples of the material of the first coloring member 50 include resins such as polyvinyl chloride resins, a polyamide resins, polyester resins, acryl resins, and urethane resins which contain a predetermined color of pigment or dye as a colorant. The first coloring member 50 is formed, for example, by screen-printing the material on the opposed surface 30a of the first protective member 30.

It is preferable that the first coloring member 50 is disposed to cover the first detection lines 113 and the second detection lines 123 in a plan view as in this embodiment. In this case, even when external light or light from a light source device 80 to be described later is reflected by the first detection lines 113 and the second detection lines 123, the light is absorbed by the first coloring member 50 before it reaches a user. Accordingly, the first detection lines 113 and the second detection lines 123 are not visible to the user well. As a result, the visibility of the input device X1 is improved. The first coloring member 50 in this embodiment is disposed to cover all the first detection lines 113 and all the second detection lines 123, but the first coloring member may be disposed to cover a part of the first detection lines 113 or a part of the second detection lines 123.

The second coloring member 60 along with the first coloring member 50 has a function of decorating the outer area $E_O$ of the input device X1. The second coloring member 60 is disposed on the second main surface 10b of the substrate 10. The same materials as in the first coloring member 50 can be used as the material of the second coloring member 60. The second coloring member 60 has a color different from a color of the first coloring member 50. Here, the "different color" means that they are different from each other in at least one of hue, lightness, and chroma in the Munsell color system.

As in this embodiment, the first coloring member 50 and the second coloring member 60 are preferably disposed so as not to overlap with each other in a plan view. Accordingly, it is possible to decorate the outer area $E_O$ of the input device X1 with two or more colors into a good design. Here, the second coloring member 60 is formed by applying the material to the second main surface 10b and exposing and developing the material, unlike the first coloring member 50.

When both the first coloring member and the second coloring member are formed between the substrate and the first protective member as in the known input device, the first coloring member is first formed on the opposed surface of the first protective member and then the second coloring member is formed on the opposed surface of the first protective member. Here, the first coloring member and the second coloring member are formed by applying the materials of the coloring members to predetermined sites on the opposed surface of the first protective member and exposing and developing the materials. However, when the material of the second coloring member is applied to a predetermined site on the opposed surface of the first protective member, a part of the material of the second coloring member runs over the first coloring member due to the surface tension. Accordingly, the second coloring member after curing is thicker than the first coloring member. A level difference occurs between the first coloring member and the second coloring member due to the difference in thickness. Since a level difference is present between the first coloring member and the second coloring member, there is a possibility that unevenness may be formed on the bonding surface of the first bonding member to be bonded to the first main surface of the substrate. Accordingly, the flatness of the bonding surface of the first bonding member in the known input device is lowered.

On the contrary, in the input device X1 according to this embodiment, the first coloring member 50 is disposed on the opposed surface 30a of the first protective member 30 in the outer area $E_O$ and the second coloring member 60 is disposed on the second main surface 10b of the substrate 10 the outer area $E_O$. That is, the second coloring member 60 is not disposed on the opposed surface 30a of the first protective member 30 in the outer area $E_O$ but only the first coloring member 50 is disposed thereon. Accordingly, it is possible to suppress the formation of unevenness on the bonding surface of the first bonding member 40, compared with the case where both the first coloring member and the second coloring member are disposed on the opposed surface of the first protective member in the outer area $E_O$ as in the known input device.

Accordingly, in the input device X1 according to this embodiment, it is possible to flatten the bonding surface of the first bonding member 40, compared with the known input device. As a result, it is possible to suppress an increase in size of the input device X1 and to improve the bonding strength between the substrate 10 and the first protective member 30.

A principle of detecting an input position in the input device X1 will be described below.

When a finger or the like as a conductor comes close to or comes in contact with the first protective member 30 corresponding to the input area $E_I$, the capacitance between the finger and the detection electrodes 111 and 121 varies. Here, a driver (not shown) disposed in the input device X1 always detects the variation in capacitance between the finger and the detection electrodes 111 and 121. When a variation in capacitance greater than a predetermined value is detected, the driver detects the position from which the variation in capacitance is detected as an input position. In this way, the input device X1 can detect the input position. Any of a mutual capacitance method and a self capacitance method can be employed as the input position detecting method in the input device X1. When the mutual capacitance method is employed, a plurality of input positions can be simultaneously detected, which is preferable in comparison with the case where the self capacitance method is employed.

Modifications of this embodiment will be described below with reference to FIGS. 4 and 5.

Figure 4:
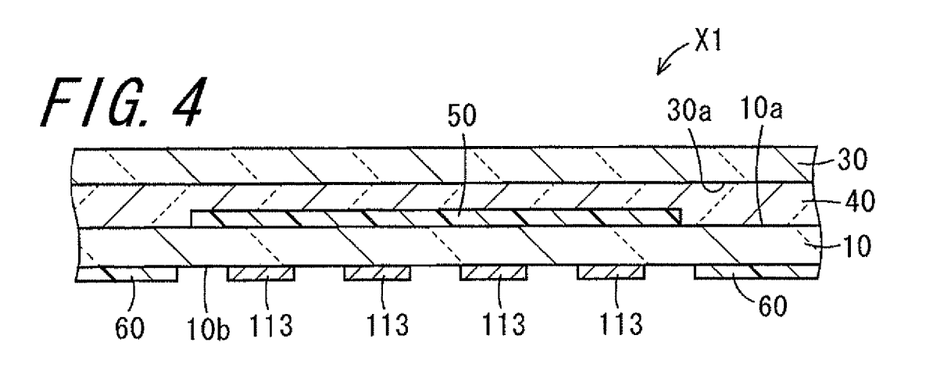
FIG. 4 is a diagram showing a first modification of the input device X1 shown in FIG. 1, corresponding to the cross-section taken along the line of FIG. 1.

FIG. 4 is a diagram showing a first modification of the input device X1 shown in FIG. 1, corresponding to the cross-section taken along the line of FIG. 1. The differences between the input device X1 shown in FIG. 4 and the input device X1 shown in FIG. 1 are as follows. The first coloring member 50 in the input device X1 shown in FIG. 1 is disposed on the opposed surface 30a of the first protective member 30, but the first coloring member 50 in the input device X1 shown in FIG. 4 is disposed on the first main surface 10a of the substrate 10. Since the first coloring member 50 is disposed on the first main surface 10a of the substrate 10, the stress applied to the first coloring member 50 by the press with a finger or the like is reduced, compared with the case where the first coloring member is disposed on the opposed surface 30a of the first protective member 30. Accordingly, it is possible to suppress the deformation of the first coloring member 50 and to keep the state of the design good.

Figure 5:
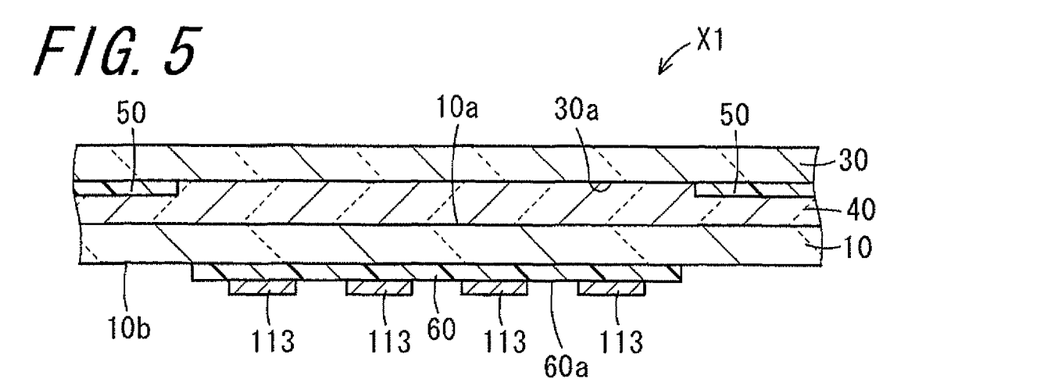
FIG. 5 is a diagram showing a second modification of the input device X1 shown in FIG. 1, corresponding to the cross-section taken along the line of FIG. 1.

FIG. 5 is a diagram showing a second modification of the input device X1 shown in FIG. 1, corresponding to the cross-section taken along the line of FIG. 1. The differences between the input device X1 shown in FIG. 5 and the input device X1 shown in FIG. 1 are as follows. The first coloring member 50 in the input device X1 shown in FIG. 1 covers the first detection lines 113 and the second detection lines 123 in a plan view, but the second coloring member 60 in the input device X1 shown in FIG. 5 covers the first detection lines 113 and the second detection lines 123 in a plan view.

Specifically, the first detection lines 113 and the second detection lines 123 are disposed on the top surface 60a of the second coloring member 60 disposed on the second main surface 10b of the substrate 10. Accordingly, since the reflected light from the first detection lines 113 and the second detection lines 123 can be satisfactorily absorbed by the second coloring member 60, it is possible to further improve the visibility.

Figure 6:
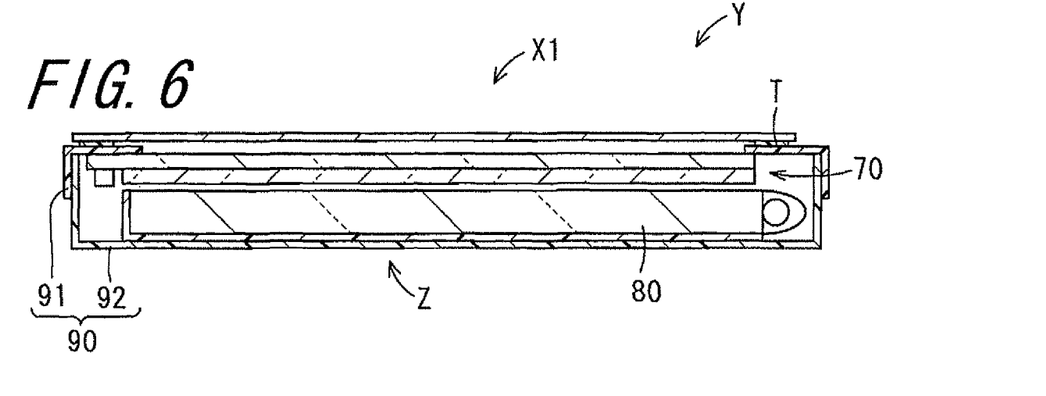
FIG. 6 is a cross-sectional view of a display device according to an embodiment of the invention.

A display device Y according to this embodiment will be described below. FIG. 6 is a cross-sectional view of the display device according to this embodiment of the invention.

As shown in FIG. 6, the display device Y includes an input device X1 and a liquid crystal display device Z. The liquid crystal display device Z includes a liquid crystal display panel 70, a light source device 80, and a case 90.

Figure 7:
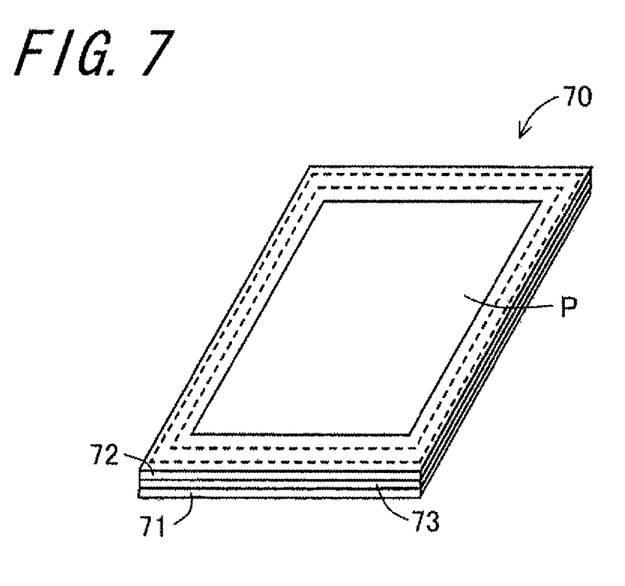
FIG. 7 is a perspective view illustrating a liquid crystal display panel 70.

FIG. 7 is a perspective view illustrating the liquid crystal display panel 70. As shown in FIG. 7, the liquid crystal display panel 70 includes an upper substrate 71, a lower substrate 72, and a sealing member 73. In the liquid crystal display panel 70, a display area P including a plurality of pixels displaying an image is formed by interposing a liquid crystal layer (not shown) between the upper substrate 71 and the lower substrate 72 and sealing the liquid crystal layer with the sealing member 73.

The liquid source device 80 serves to emit light to the liquid crystal display panel 70 and is disposed between the liquid crystal display panel 70 and a lower case 92.

The case 90 is a member receiving the liquid crystal display panel 70 and the light source device 80 and includes an upper case 91 and a lower case 92. Examples of the material of the case 90 includes resins such as polycarbonate resins and metals such as stainless steel (SUS) or aluminum.

The input device X1 and the liquid crystal display device Z are bonded to each other with a double-sided tape T at the edge of the input device X1 and the liquid crystal display device Z. The fixing member used to fix the input device X1 and the liquid crystal display device Z is not limited to the double-sided tape T, but an adhesive member such as a thermosetting resin or an ultraviolet-curable resin or a fixing structure physically fixing the input device X1 and the liquid crystal display device Z to each other can be used.

In the display device Y, the behavior of the liquid crystal layer is controlled on a pixel to pixel basis by the use of a liquid crystal driving circuit disposed outside and light from the light source device 80 is transmitted through the liquid crystal display panel 70, whereby an image can be displayed in the display area P.

The display device Z includes the input device X1 as described above. Accordingly, in the display device Y, it is possible to improve the bonding strength between the substrate 10 and the first protective member 30 and to suppress an increase in size.

Second Embodiment

Figure 8A:
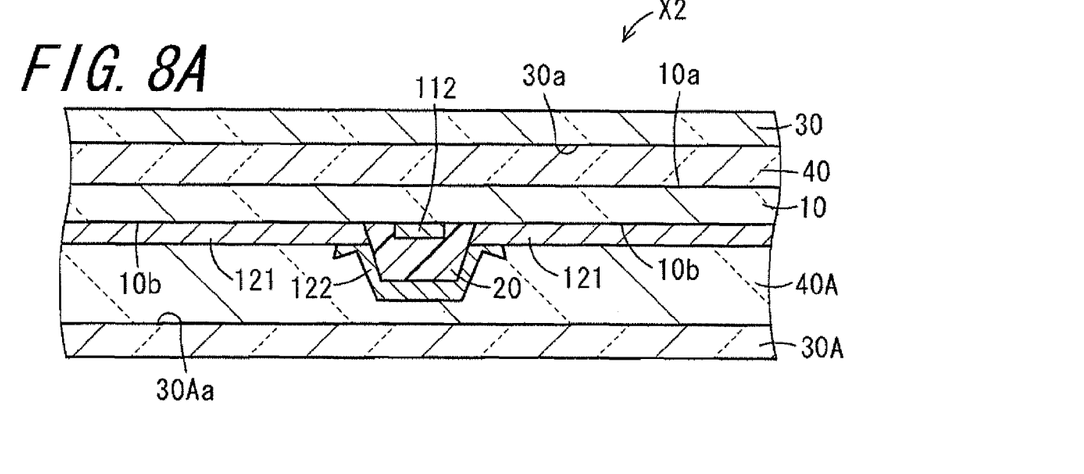
FIG. 8A is a diagram illustrating an input device X2 according to a second embodiment of the invention, corresponding to the cross-sectional view taken along the line I-I of FIG. 1.
Figure 8B:
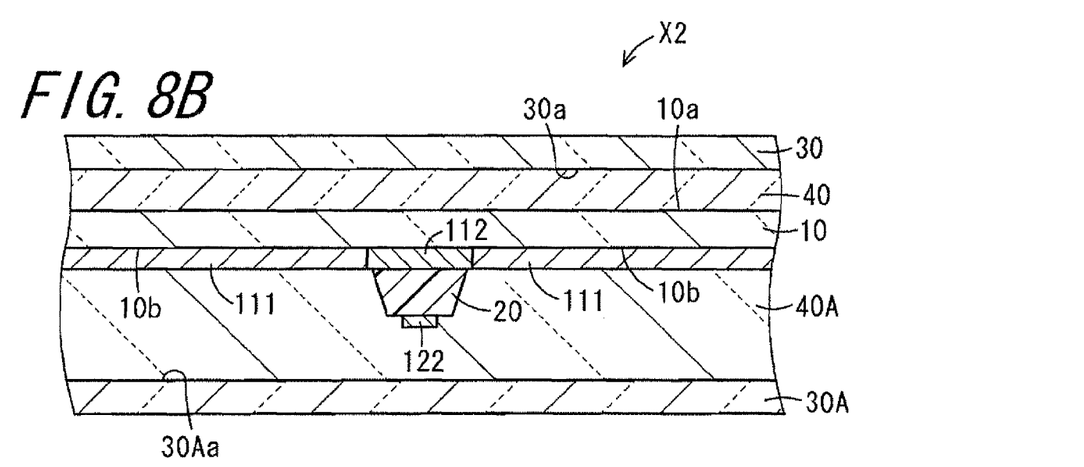
FIG. 8B is a diagram illustrating the input device X2 according to the second embodiment of the invention, corresponding to the cross-sectional view taken along the line II-II of FIG. 1.
Figure 9:
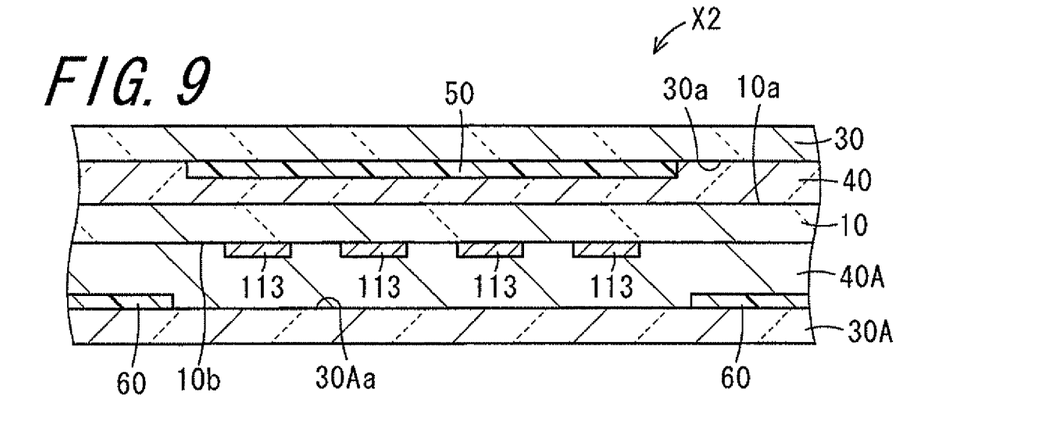
FIG. 9 is a diagram illustrating the input device X2 according to the second embodiment of the invention, corresponding to the cross-sectional view taken along the line of FIG. 1.

An input device X2 according to a second embodiment of the invention will be described below with reference to FIGS. 8A, 8B, and 9. FIG. 8A is a diagram illustrating the input device X2 according to the second embodiment of the invention, corresponding to the cross-sectional view taken along the line I-I of FIG. 1. FIG. 8B is a diagram illustrating the input device X2 according to the second embodiment of the invention, corresponding to the cross-sectional view taken along the line II-II of FIG. 1. FIG. 9 is a diagram illustrating the input device X2 according to the second embodiment of the invention, corresponding to the cross-sectional view taken along the line of FIG. 1. Components having the same functions as in the input device X1 are denoted by the same reference signs and the same description as in the input device X1 will not be repeated.

The input device X2 is different from the input device X1, in that the input device X2 further includes a second protective member 30A and a second bonding member 40A. The input device X2 is also different from the input device X1, in that the second coloring member 60 is disposed in the second protective member 30A.

The second protective member 30A has a function of suppressing a direct contact of a conductor such as a finger with the first detection electrodes 111 and the second detection electrodes 121 from the outside. The second protective member 30A includes an opposed surface 30Aa facing the second main surface 10b of the substrate 10.

The second bonding member 40A has a function of bonding the second main surface 10b of the substrate 10 and the opposed surface 30Aa of the second protective member 30A to each other.

The second coloring member 60 is disposed on the opposed surface 30Aa of the second protective member 30A and is covered with the second bonding member 40A.

In the input device X2, the first coloring member 50 is disposed on the opposed surface 30a of the first protective member 30 in the outer area $E_O$ and the second coloring member 60 is disposed on the opposed surface 30Aa of the second protective member 30A in the outer area $E_O$. Accordingly, it is possible to flatten the bonding surface of the first bonding member 40, to suppress an increase in size of the input device X2, and to enhance the bonding strength between the substrate 10 and the first protective member 30, which are the same advantages as in the first embodiment.

The second coloring member 60 is disposed on the opposed surface 30Aa of the second protective member 30A in the outer area $E_O$. The resin constituting the second coloring member 60 generally has a dielectric constant lower than that of glass or plastics which is the material of the substrate 10. For example, the dielectric constant of glass is equal to or more than about 7.0 but the dielectric constant of the resin constituting the second coloring member 60 is equal to or more than about 3.5. Accordingly, by disposing the second coloring member 60 having a low dielectric constant on the opposed surface 30Aa of the second protective member 30A in the outer area $E_O$, it is possible to reduce floating charge generated between the first detection lines 113 and between the second detection lines 123.

Third Embodiment

Figure 10:
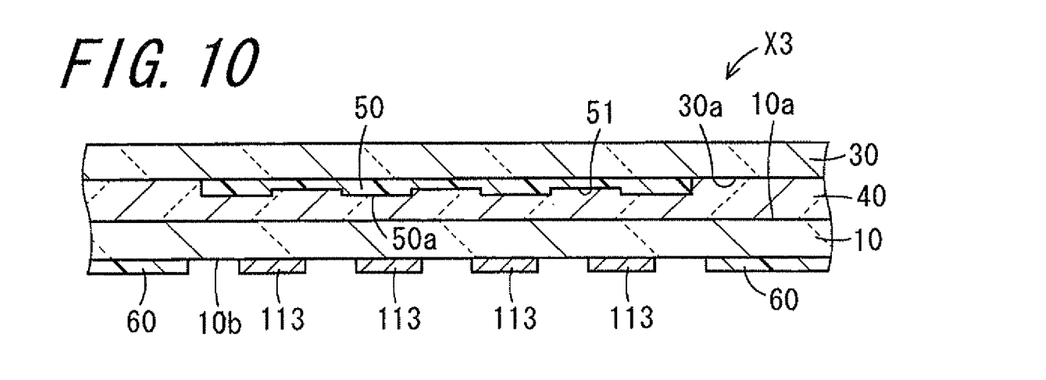
FIG. 10 is a diagram illustrating an input device X3 according to a third embodiment of the invention, corresponding to the cross-sectional view taken along the line of FIG. 1.

An input device X3 according to a third embodiment of the invention will be described below with reference to FIG. 10. FIG. 10 is a diagram illustrating the input device X3 according to the third embodiment of the invention, corresponding to the cross-sectional view taken along the line of FIG. 1. Components having the same functions as in the input device X1 are denoted by the same reference signs and the same description as in the input device X1 will not be repeated.

The input device X3 is different from the input device X1, in that concave holes 51 opened on the opposed surface 50a facing the first bonding member 40 are formed in the first coloring member 50 of the input device X3. The shape of the holes 51 and the number of the holes 51 are not particularly limited.

By forming the holes 51 in the first coloring member 50, the first coloring member 50 and the first bonding member 40 are bonded to each other in the state where the first bonding member 40 is buried in the holes 51.

Since the first bonding member 40 is bonded to the inner wall surfaces of the first coloring member 50 facing the holes 51, the bonding area between the first coloring member 50 and the first bonding member 40 increases by the inner wall surfaces of the first coloring member 50 facing the holes 51. By this increase in bonding area, it is possible to enhance the bonding strength between the first coloring member 50 and the first bonding member 40.

The pressing with a finger or the like is repeatedly performed on the input device X3, but it is possible to reduce the possibility of separating the first coloring member 50 and the first bonding member 40 from each other by enhancing the bonding strength between the first coloring member 50 and the first bonding member 40.

The holes 51 are preferably distributed uniformly on the opposed surface 50a of the first coloring member 50. The holes 51 only have to be formed in the first coloring member 50 with such an aperture size, a hole depth, and a distribution density in the opposed surface 50a not to damage the function of decorating the outer area $E_O$, which is the function inherent to the first coloring member 50. The aperture size of the holes 51 is preferably in the range of 20 to 30 μm. The depth of the holes 51 is preferably in the range of 0.5 to 2 μm.

The example where the holes 51 are concave holes opened on the opposed surface 50a facing the first bonding member 40 is described above, but the invention is not limited to this example. For example, the holes 51 may be through-holes. When the holes 51 are through-holes, the decoration (visibility) of the first coloring member 50 may be lowered. However, since the bonding area between the first coloring member 50 and the first bonding member 40 is larger in the inner wall surfaces facing the through holes than in the inner wall surfaces facing the concave holes, the bonding strength between the first coloring member 50 and the first bonding member 40 is further enhanced.

The above-mentioned embodiments are only specific examples of the invention, and may be modified in various forms without departing from the concept of the invention.

That is, it has been stated in the above-mentioned embodiments that the outer area $E_O$ is decorated with two colors of the first coloring member 50 and the second coloring member 60, but the outer area $E_O$ may be decorated with three or more colors by providing another coloring member in addition to the first coloring member 50 and the second coloring member 60.

It has been stated in the above-mentioned embodiment that information can be input to the input device X1 by causing a user to bring his or her finger or the like into contact with or close to the surface of the first protective member 30 opposite to the opposed surface 30a, but the invention is not limited to this configuration. For example, as described with reference to FIGS. 8A and 8B in the second embodiment, information may be input to the input device X1 by causing a user to bring his or her finger or the like into contact with or close to the surface of the second protective member 30A opposite to the opposed surface 30Aa.

It has been stated in the above-mentioned embodiments that the first coloring member 50 and the second coloring member 60 are disposed so as not to overlap with each other in a plan view, but the first coloring member 50 and the second coloring member 60 may be instead disposed so as to overlap with each other in a plan view at the boundary between the first coloring member 50 and the second coloring member 60. Accordingly, it is possible to suppress, for example, leakage of the light from the light source device 80 through the boundary between the first coloring member 50 and the second coloring member 60.

It has been stated in the above-mentioned embodiment that the first coloring member 50 is disposed between the first main surface 10a and the opposed surface 30a in the outer area $E_O$ and the second coloring member 60 is disposed on the second main surface 10b in the outer area $E_O$, but the invention is not limited to this configuration. That is, the first coloring member 50 may be disposed between the first main surface 10a and the opposed surface 30a in the input area $E_I$ and the second coloring member 60 may be disposed on the second main surface 10b in the input area $E_I$. That is, a case where it is necessary to decorate the input area $E_I$ can be also considered.

It has been stated in the above-mentioned embodiments that the input device is a capacitive touch panel, but, for example, a resistive touch panel may be employed instead. The resistive touch panel includes an upper substrate having a first transparent electrode on one main surface, a lower substrate disposed to face the upper substrate and having a second transparent electrode on a main surface facing the first transparent electrode, and a protective member disposed on the other main surface of the upper substrate. In this case, the upper substrate corresponds to the substrate 10 and the protective member corresponds to the first protective member 30. That is, in the resistive touch panel, the same advantages as in the above-mentioned embodiments can be achieved by disposing the first coloring member between the protective member and the upper substrate in the outer area $E_O$ and disposing the second coloring member on one main surface of the upper substrate in the outer area $E_O$.

An example of the display device Y including the input device X1 has been stated, but the display device Y may include the input device X2 instead of the input device X1.

An example where the display panel of the display device Y is a liquid crystal display panel, but the invention is not limited to this example. That is, the display panel may be a CRT, a plasma display, an organic EL display, an inorganic EL display, an LED display, a fluorescent display tube, a field emission display, a surface-condition electron-emitter display, or an electronic paper.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

10: Substrate
11: First detection electrode pattern
111: First detection electrode 112: First connection electrode
113: First detection line
12: Second detection electrode pattern
121: Second detection electrode
122: Second connection electrode
123: Second detection line
20: Insulating film
30: First protective member
40: First bonding member
50: First coloring member
60: Second coloring member
70: Liquid crystal display panel
30A: Second protective member
40A: Second bonding member
X1, X2: Input device
Y: Display device
Z: Liquid crystal display device

The invention claimed is:

1. An input device, comprising:
a substrate having a first main surface and a second main surface located opposite to the first main surface;
a first protective member having a first opposed surface opposite to the first main surface;
a second protective member having a second opposed surface opposite to the second main surface;
a first bonding member configured to bond the first main surface and the first opposed surface to each other;
a second bonding member configured to bond the second main surface and the second opposed surface to each other;
a first coloring member disposed between the first main surface and the first opposed surface, the first coloring member being in contact with the first bonding member; and
a second coloring member disposed on the second main surface, the second coloring member being in contact with the second bonding member, and having a color different from a color of the first coloring member.

2. The input device according to claim 1, wherein the input device includes an input area and an outer area located outside the input area,
wherein the first coloring member is disposed between the first main surface and the first opposed surface in the outer area, and
wherein the second coloring member is disposed on the second opposed surface in the outer area.

3. A display device, comprising:
the input device according to claim 1; and
a display panel disposed to face the input device.

4. The display device according to claim 3, wherein the display panel is a liquid crystal display panel.

* * * * *